United States Patent Office 2,918,332
Patented Dec. 22, 1959

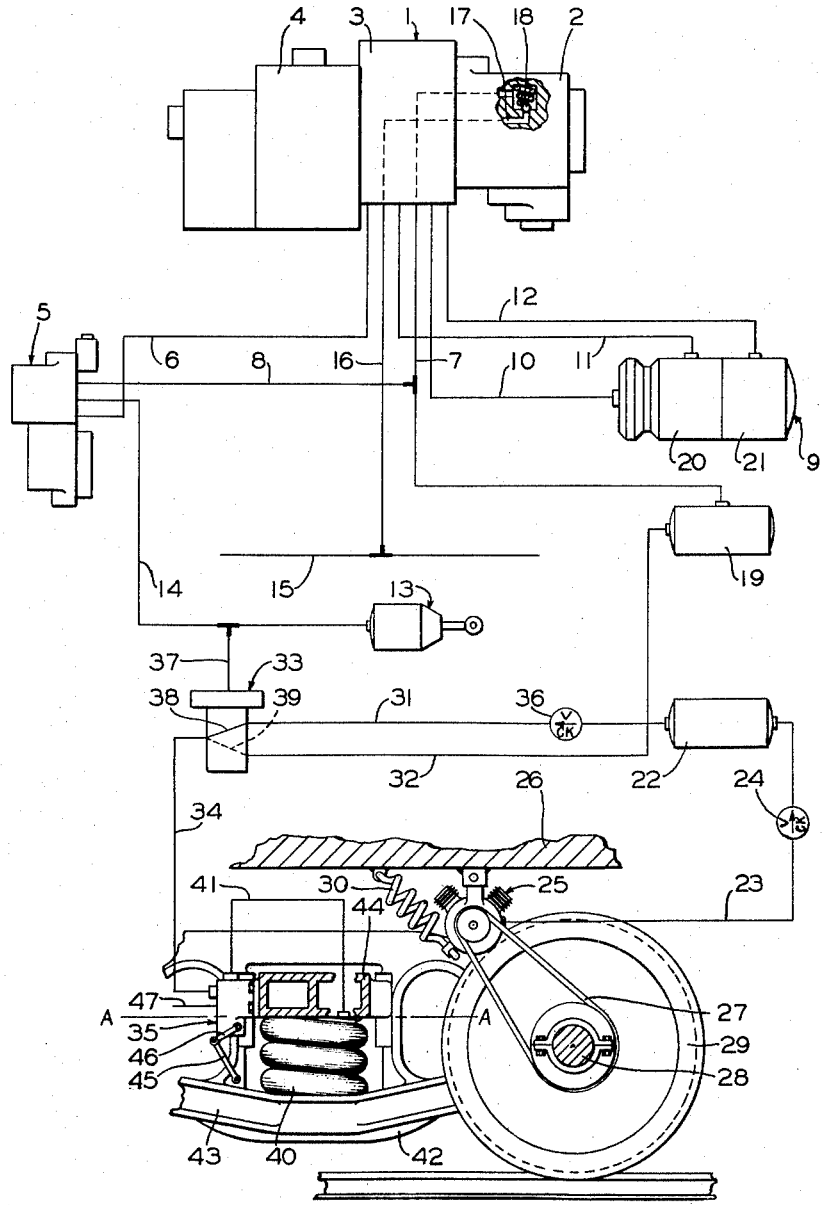

2,918,332

AIR SUPPLY ARRANGEMENT FOR AIR SPRING SUSPENSION SYSTEM OF RAILWAY CARS

Claude M. Hines, Verona, Pa., assignor to Westinghouse Air Brake Company, Wilmerding, Pa., a corporation of Pennsylvania Application September 29, 1958, Serial No. 763,933

4 Claims. (Cl. 303—22)

This invention relates to air supply arrangements for air spring suspension systems for railway vehicles, and, more particularly, to an arrangement whereby the air supply for the air spring suspension system normally from a source of fluid under pressure independent of the air brake system is automatically transferred to an alternate source in the air brake system of the vehicle upon cessation of motion of the vehicle.

In some of the presently known arrangements, the supply of air pressure for the air springs of the suspension system of a vehicle is provided solely from a source in the air brake system, such as the brake pipe, for example. Such an arrangement might prove undesirable, however, in that should the air springs on several cars require air pressure concurrently, it is conceivable that such a concentrated demand of pressure thus placed on the brake pipe would be sufficient to cause a brake pipe reduction to the extent that an untimely and undesirable brake application would be effected thereby. On the other hand, to rely solely on some other independent source of fluid pressure, such as a compressor operated by motion of the vehicle over the right of way, either by oscillation of the sprung portion of the vehicle or by rotation of the vehicle wheel, would not necessarily be a satisfactory arrangement either. During such time that the car or vehicle is not in motion, the compressor is not operating to charge the fluid pressure storage reservoir, and the reservoir as well as the air springs on the car might well be devoid of pressure at the time said car is coupled to a train. It is possible, therefore, that the car would be moved over the right of way without benefit of air spring suspension until such time as would be required by the compressor to charge the reservoir and the air springs. Under such conditions, the resulting undue strain and jarring of the car body and trucks could cause extensive damage thereto, not to mention discomfort to passengers.

Accordingly, the primary object of the present invention is to provide an air supply arrangement for the air spring suspension system of a railway type vehicle whereby air supply for the air springs in the system is assured at all times, that is, whether the vehicle is in motion or standing still, without placing an excessive pressure demand on the air brake system supply source.

Such an arrangement for supplying air to the air springs of an air spring suspension system and constituting the present invention comprises a first reservoir charged with fluid under pressure supplied from the brake pipe of the air brake system and an alternate reservoir charged independently by a compressor driven by motion of the vehicle over the right of way with a selector valve device arranged between the two reservoirs for normally connecting said alternate reservoir to a supply conduit leading to a load-responsive regulating valve controlling the air pressure in the air springs, said selector valve device being operably responsive to brake cylinder pressure or displacement reservoir pressure, when a brake application is effected on the vehicle, for cutting off said alternate reservoir from said supply conduit and connecting said first reservoir thereto, thereby reducing to a minimum any excessive fluid pressure demand on the air in the brake system while the vehicle is in motion and insuring supply of fluid pressure for the air springs during such time that the vehicle brakes are applied and the vehicle may be motionless. The load-responsive regulating valve, or leveling valve device, has a conduit leading therefrom to the air spring and maintains the appropriate degree of pressure in the air spring for maintaining the sprung portion of the vehicle at a constant level.

The accompanying single figure drawing is a schematic view showing the air supply arrangement embodying the invention.

Referring to the drawing, the apparatus, as shown, comprises a brake control valve device 1, such as the well-known Westinghouse D–22 type described for example in U.S. Patent 2,152,257. Briefly, valve device 1 consists of a service portion 2, a pipe bracket portion 3, and an emergency portion 4. The apparatus further comprises a relay valve device 5 of any well-known type connected to the valve device 1, through the pipe bracket portion 3, via a control pipe 6, a supply pipe 7 and a branch pipe 8, and a combined displacement-auxiliary-emergency reservoir unit 9 connected to the valve device 1, through said pipe bracket portion, via pipes 10, 11 and 12, respectively. A brake cylinder device 13 is connected to the delivery port of relay valve device 5 via a pipe 14. Also shown in the drawing is a portion of a train brake pipe 15 connected by a branch pipe 16 to the brake control valve device 1.

A detailed description of the structures and functions of the brake control valve device 1, the relay valve device 5, the reservoir unit 9 and the brake cylinder device 13 is not deemed essential to an understanding of the invention, and, therefore, such description has been intentionally omitted herein. The devices immediately above-mentioned are shown, in outline, in the drawing merely for the purpose of illustrating one method of arranging applicant's invention in a typical air brake system, it being understood that said air brake system need not be limited to the particular one shown.

For purposes of the present invention it is important merely to note that the brake control valve device 1 provides a communication 17, including a check valve 18, which permits flow of fluid under pressure from brake pipe 15 to supply pipe 7 leading to a supply reservoir 19 and prevents flow in the reverse direction. By way of a very brief operational description, the brake control valve device 1 comprises valve means (not shown) responsive to charging of brake pipe 15 with fluid under pressure at the locomotive to supply fluid under pressure, via pipe 11, to an auxiliary reservoir 20 of the reservoir unit 9 and, via pipe 12, to an emergency reservoir 21 of said reservoir unit for charging said reservoirs at a pressure equal to that in the brake pipe. The valve means (not shown) in the control valve device 1 is further responsive to reduction of fluid pressure in the brake pipe 15 at a service rate for effecting supply of fluid under pressure from the auxiliary reservoir 20 to control pipe 6 for piloting operation of the relay valve device 5 to effect supply of fluid to the brake cylinder device 13 from the supply reservoir 19 at a pressure proportional to the pilot pressure supplied to the relay valve device, and is responsive to reduction of fluid pressure in said brake pipe at an emergency rate for effecting supply of fluid under pressure from both the auxiliary reservoir 20 and the emergency reservoir 21 to control pipe 6 at a high degree of pressure for piloting operation of relay valve device 5 to effect supply of correspondingly higher fluid pressure from supply reservoir 19 to the brake cylinder device. In each case the relay valve device 5 operates to supply fluid from the supply reservoir 19, via pipes 8 and 14, at a pressure proportional to the pressure of fluid established in control pipe 6.

While it is preferable that the supply reservoir 19, which is the storage reservoir for fluid under pressure for operating the brake cylinder device 13, be used in the arrangement embodying the invention, it should be understood that, if desired, a separate reservoir, charged directly from the brake pipe through a check valve and bypassing the control valve device 1, may be used.

In accordance with the invention a second storage reservoir 22, charged with fluid under pressure independently of the air brake system, provides another source of fluid pressure for the air spring suspension system. Reservoir 22 is charged via a conduit 23, in which a check valve 24 is interposed for preventing reverse flow, by a compressor 25 suspended from a sprung portion 26 of the vehicle and driven through a belt 27 from an axle 28 of a wheel 29 as the vehicle moves over the right of way. If desired, any other suitable compressor means may be employed, such as an oscillation type pump driven by the slight bouncing motion of the vehicle body, for charging the reservoir 22. In the arrangement shown, a spring 30 having one end attached to the compressor 25 and the other end attached to the unsprung portion 26 serves to maintain proper tension on the drive belt 27. Reservoirs 19 and 22 are selectively connectable through respective conduits 31 and 32 and a selector valve device 33 to a conduit 34 leading to a leveling valve device 35. A check valve 36 is interposed in pipe 31 to prevent reverse flow from the selector valve device 33 toward the reservoir 22.

The selector valve device 33 is connected by a branch pipe 37 to pipe 14 leading to the brake cylinder device 13 and is operably responsive to pressure of fluid supplied through pipe 37 from said brake cylinder device. Though not shown in detail, the selector valve device 33 may comprise a spring biased, piston operated valve which normally occupies a first position in which a communication 38, indicated in the drawing by a solid line, connects pipe 31 to supply pipe 34, said valve being operable by the piston, in response to fluid at a pressure in excess of a predetermined minimum degree of pressure supplied to the brake cylinder device 13 and acting through pipe 37 on the valve piston in the selector valve device, to a second position in which communication 38 is disestablished and a communication 39, indicated in the drawing by a broken line, is established to connect pipe 32 to said supply pipe 34. The spring, which acts to bias the valve to its first position, is generally adjusted to such a compression that it will yield and, therefore, permit said valve to operate to its second position in response to fluid at a pressure in excess of the minimum degree of fluid pressure above mentioned. This minimum degree of fluid pressure is determined by the degree of fluid pressure supplied to the brake cylinder device 13 and necessary to effect a brake application of sufficient magnitude to bring the vehicle to a stop, such as 40 pounds per square inch, for example. Any brake application, therefore, effected by less than a pressure of 40 pounds per square inch, such as an application for merely retarding or slowing down the vehicle, for example, is not effective for overcoming the spring and operating the valve in the selector valve device 33 from its first to its second position, the purpose of which will be hereinafter explained.

The leveling valve device 35 is a component of a typical air spring suspension arrangement comprising, in addition to said leveling valve device, an air spring 40 connected via a conduit 41 to said valve device. The air spring 40 rests on a spring pad 42 carried by a wheel-truck side frame 43 of the railway vehicle, said side frame constituting an unsprung portion of the vehicle, while a bolster 44, which supports the center sill (not shown) of the vehicle, rests on said air spring and constitutes a sprung portion of the vehicle to which the leveling valve device 35 is fastened. Relative movement between the sprung portion 44 and the unsprung portion 43 is reflected through a pair of pivotally connected levers 45 and 46, one (45) of said levers being pivotally anchored to the truck side frame 43, while the other (46) is operatively connected to a rotary operating shaft (not shown) of the leveling device 35.

The air spring 40 and the leveling valve device 35, details of which are not deemed necessary to be shown for purposes of the present invention, are of the usual type and operate in the usual manner to maintain the bolster 44, and therefore the sprung portion of the vehicle, at a preselected height relative to the axle 28 on which the wheel 29 is mounted, said preselected height being indicated by the line A—A in the drawing coinciding with the upper surface of the air spring as shown. For a predetermined degree of fluid pressure in the air spring 40, said spring supports a given load at such a level that the bolster 44 assumes a normal position or level indicated by line A—A. An increase in vehicle load causes the spring 40 to be compressed and thereby causes relative movement of the levers 45 and 46, such movement being effective for operating the leveling valve device 35 to establish a communication (not shown) in said valve device between conduits 34 and 41, whereby fluid pressure from pipe 34 as supplied from either the supply reservoir 19 or the independent supply reservoir 22, as above described, may flow to the air spring to increase the degree of pressure therein and expand the spring to raise the sprung portion of the vehicle until the bolster attains its normal position at the level of line A—A, as shown in the drawing. When the bolster 44 attains its normal level, the valve means (not shown) in the leveling valve device 35 is restored to lap position and thereby maintains the necessary pressure in the air spring 40 to maintain the bolster 44 in its normal position. If the load on the vehicle is decreased, fluid pressure in the air spring 40 will expand said air spring to lift the bolster above its normal level, thereby causing relative movement of the levers 45 and 46. Upon such relative movement, lever 46 is effective for operating the leveling valve device 35 to cut off the supply communication between conduits 34 and 41 and to open said conduit 41, and therefore the air spring, to an atmospheric exhaust 47 to relieve fluid pressure from said air spring until the bolster 44 is lowered back down to its normal level, at which point said leveling valve device operates to lap position, as above noted, to maintain said bolster at said normal level until a further change in the vehicle load occurs.

The apparatus embodying the invention, as just described, operates in the following manner. Let it be assumed that a railway car, equipped with the above-described apparatus, is coupled in a moving train. While the train is in motion, the compressor 25 is operated by rotation of the wheel 29 to maintain the reservoir 22 charged with fluid at a selected pressure. Since the brakes of the vehicle are normally in release position while the vehicle is in motion, there is no fluid pressure acting in the brake cylinder device 13 and, therefore, in the selector valve device 33. With no brake cylinder pressure acting in the selector valve device 33, the communication 38 is open to permit fluid pressure for the air spring 40 to be supplied from the reservoir 22, thereby eliminating the possibility of any excessive demand for such fluid pressure from the brake system reservoir 19 which might cause sufficient reduction in the brake pipe 15 to effect an untimely and undesirable brake application.

While the vehicle is in motion, let it be assumed that a brake application is effected. If the brake application is a "light" application, that is, one for merely slowing down the train, and the degree of fluid pressure supplied to the brake cylinder device 13 is less than the predetermined minimum degree above defined, the selector valve device 33 is unresponsive to said fluid pressure and, therefore, retains communication 38 open. If the brake application is a "heavy" application, however, that is, one intended to bring the train to a stop, it can be assumed that the degree of fluid pressure acting in the brake cylinder 13 and the selector valve device 33 is in excess of the predetermined minimum degree and is, therefore, effective for causing said selector valve device to operate to cut off communication 38 and open communication 39, thereby permitting supply of fluid pressure for the air spring 40 from the brake system reservoir 19 while the vehicle is stopped and the compressor 25 is not operating to charge reservoir 22. It is thus seen that the air spring 40 is assured of a constant supply of fluid pressure whether the vehicle is moving or standing still.

Having now described my invention, what I claim as new and desire to secure by Letters Patent, is:

1. A multiple source arrangement for furnishing fluid under pressure to charge an air spring of an air spring suspension system of a railway vehicle having an air brake system including a brake cylinder device operable responsively to fluid pressure for effecting retardation of the vehicle, said arrangement comprising, in combination, a first reservoir charged with fluid under pressure from a first source, a second reservoir charged with fluid under pressure from a source independent of said first source, a conduit through which fluid under pressure may be supplied to the air spring of the suspension system, and valve means for normally connecting said second reservoir to said conduit and being operable responsively to pressure of fluid supplied to said brake cylinder device for cutting off said second reservoir and connecting said first reservoir to said conduit.

2. The combination defined in claim 1 wherein the valve means comprises a selector valve device having a first communication connected to said first reservoir and a second communication connected to said second reservoir, and a valve normally occupying one position in which the second communication is connected to the conduit and being operable in response to fluid supplied to the brake cylinder device in excess of a predetermined minimum degree of pressure, to a different position in which said second communication is cut off from and said first communication is connected to the conduit.

3. In a railway vehicle of the type having an air brake system including a reservoir charged with fluid under pressure from which fluid under pressure may be supplied to a brake cylinder device for effecting a brake application on the vehicle, the arrangement for furnishing fluid under pressure to charge an air spring suspension system for the vehicle comprising the combination with said reservoir of a second reservoir, compressor means on the vehicle independent of the air brake system for charging said second reservoir, a conduit through which fluid under pressure may be supplied to charge the air spring suspension system, and valve means for normally connecting said second reservoir to said conduit and being operable responsively to pressure of fluid supplied to said brake cylinder device for cutting off said second reservoir from and connecting the first said reservoir to said conduit.

4. An arrangement for supplying fluid under pressure to an air spring suspension system of a railway vehicle having a sprung portion, an unsprung portion and an air brake system including a brake pipe normally charged with fluid under pressure and a brake cylinder device operable responsively to fluid pressure for effecting a brake application on the vehicle, said arrangement comprising, in combination, a first reservoir connected to said brake pipe and charged by fluid under pressure therefrom, a second reservoir, a fluid compressor carried by said vehicle and operable by traveling motion of the vehicle for charging said second reservoir with fluid under pressure, air spring means for resiliently supporting said sprung portion in vertically spaced relation to said unsprung portion, conduit means to provide for flow of fluid under pressure to said air spring means from one or the other of said reservoirs, a selector valve device for normally connecting said second reservoir to said conduit and being operable responsively to fluid supplied to said brake cylinder device in excess of a predetermined degree of pressure for selectively cutting off said second reservoir from the conduit means and connecting the first reservoir thereto, and a leveling valve device carried by said sprung portion and interposed in said conduit means between said selector valve device and said air spring means for so controlling the pressure of fluid in said air spring means as to cause the air spring means to support said sprung portion at a preselected height relative to the unsprung portion irrespective of the load.

No references cited.